United States Patent [19]

Mondocea et al.

[11] Patent Number: 4,984,107
[45] Date of Patent: Jan. 8, 1991

[54] APPARATUS FOR TRANSPORTING A MAGNETIC TAPE CASSETTE

[75] Inventors: Ionel Mondocea, Glendale; John P. Grant, Downey; Frederic F. Grant, Bellflower, all of Calif.

[73] Assignee: Datatape Incorporated, Pasadena, Calif.

[21] Appl. No.: 285,833

[22] Filed: Dec. 16, 1988

[51] Int. Cl.⁵ .............................................. G11B 15/68
[52] U.S. Cl. ...................................... 360/92; 360/69; 414/280; 414/282
[58] Field of Search ............... 360/69, 71, 92; 369/34, 369/35; 414/280, 282

[56] References Cited

U.S. PATENT DOCUMENTS

| | | | |
|---|---|---|---|
| 2,980,265 | 4/1961 | Johnson et al. | 414/591 |
| 3,557,977 | 1/1971 | Atwater | 214/16.4 |
| 3,938,190 | 2/1976 | Semmlow et al. | 360/92 |
| 4,099,102 | 7/1978 | Moll | 318/85 |
| 4,113,119 | 9/1978 | Brown et al. | 214/16.4 A |
| 4,363,257 | 12/1982 | Harris et al. | 89/1.802 |
| 4,563,120 | 1/1986 | Josserand | 414/280 X |
| 4,846,619 | 7/1989 | Crabtree et al. | 414/280 X |

OTHER PUBLICATIONS

Noval; William F.

*Primary Examiner*—Robert S. Tupper
*Assistant Examiner*—Andrew L. Sniezek

[57] ABSTRACT

A magnetic tape cassette transport/accessor assembly for use in a system including magnetic tape cassette storage and magnetic tape cassette record/reproduce apparatus. The cassette transport/accessor assembly transports cassettes between locations in the system in a gentle and reliable manner. The magnetic tape cassette transport/accessor assembly includes upper and lower carriages having spring-biased, V-grooved wheels, which travel on spaced, parallel, upper and lower V-shaped horizontal rails located at the top and bottom of the cassette storage and record/reproduce apparatus. An accessor platform travels on two vertical rails rigidly mounted on the upper and lower carriages. The accessor platform supports two accessor assemblies which travel laterally on lead screws to effect insertion and extraction of magnetic tape cassettes. The transport/accessor assembly is lightweight since no actuating motors or motor supports are mounted on it. Thus, the assembly is easy to remove and replace, requires minimal maintenance and has a long operating life.

3 Claims, 6 Drawing Sheets

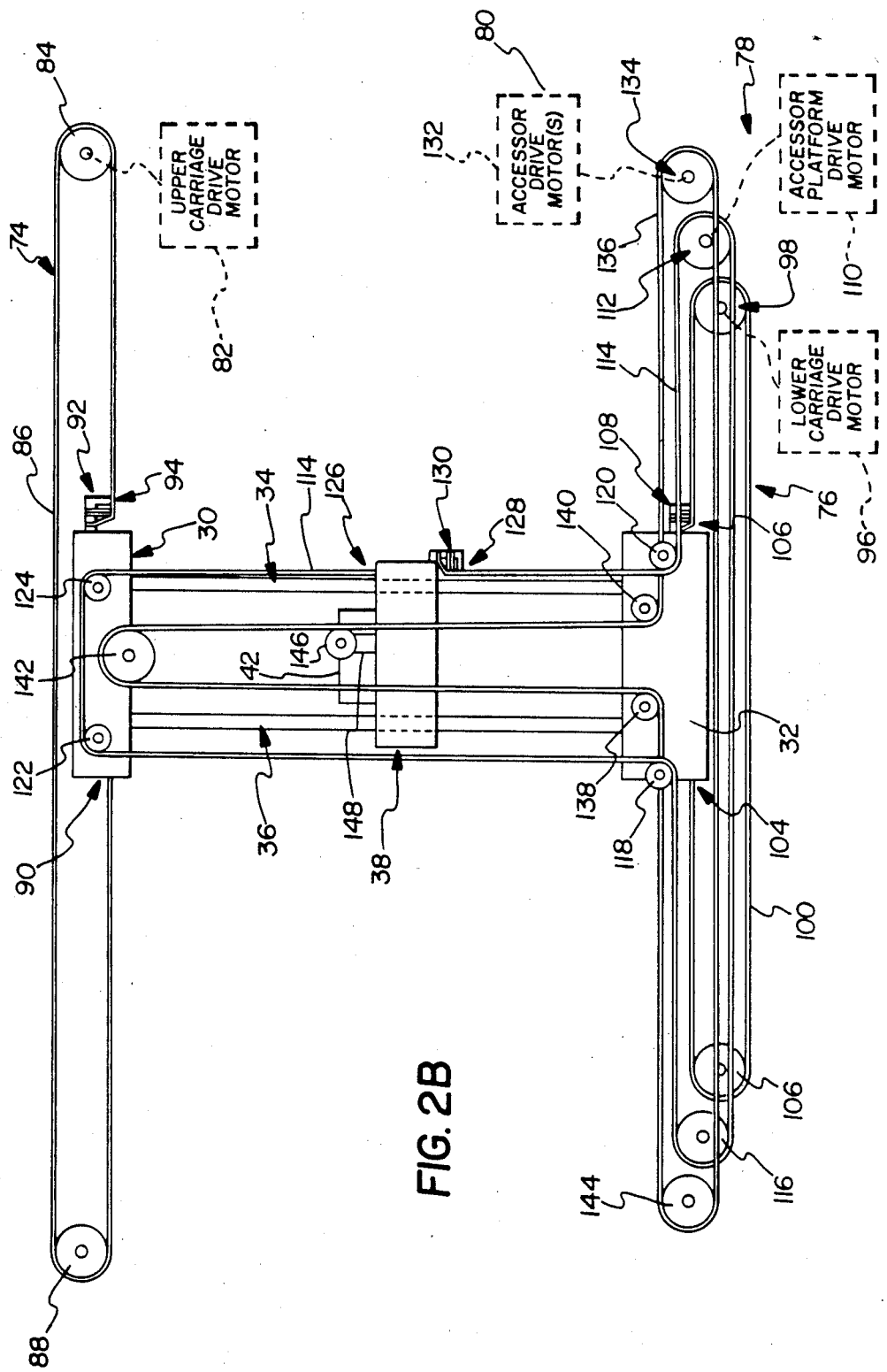

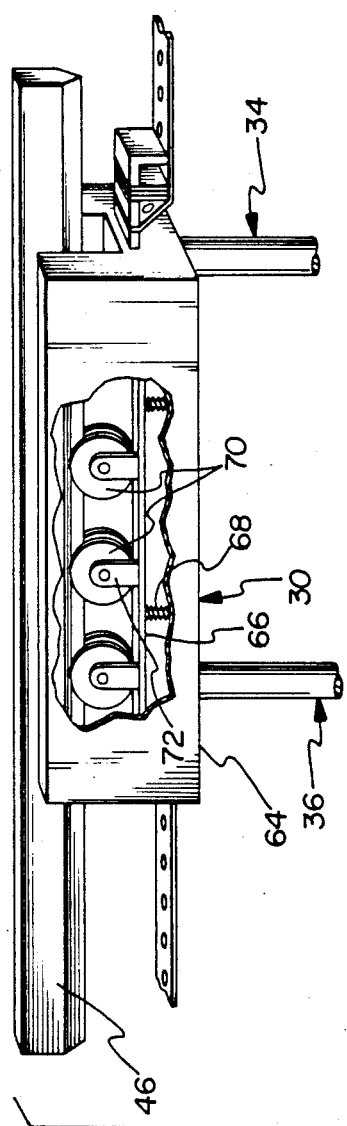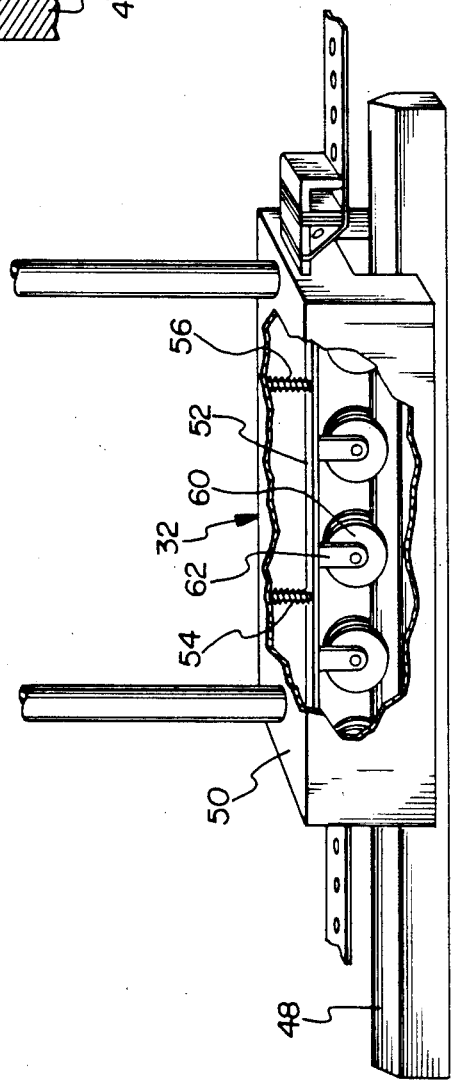

APPARATUS FOR TRANSPORTING A MAGNETIC TAPE CASSETTE

BACKGROUND OF THE INVENTION

This invention relates in general to magnetic tape cassette transport apparatus, and, more particularly, to a magnetic tape cassette transport/accessor assembly, which is lightweight and reliable, which is easy to remove and replace, and which requires little maintenance.

In applications in which a large amount of information is stored on electronic media (such as the storage of digital information on a plurality of magnetic tape cassettes), it is often desirable that each unit of storage (e.g., magnetic tape cassette), be accessed in a minimum amount of time. For example, it is desirable to minimize the time required to change over from one cassette to another cassette used in a magnetic tape record/reproduce device. Where the cassette storage system includes a large number of cassette storage compartments, it is also desirable that the cassette be transported between a storage compartment and a record/reproduce device, in a gentle manner which minimizes damage to the cassette by eliminating rough or jerky movements in the cassette transport device. It is also desirable that the cassette transport/accessor assembly be reliable, be easy to remove and replace, require little maintenance, and have a long operating life.

In storage systems which include a matrix of horizontal and vertical storage locations, apparatus for loading and unloading articles from the storage locations have been proposed which are heavy, difficult to remove and replace, and difficult to maintain. Thus, U.S. Pat. No. 3,557,977, issued Jan. 26, 1971, entitled "Load Detecting Device For Warehousing System", discloses a warehousing system including a powered load carrier for inserting and removing loads relative to storage locations of a storage system. The load carrier includes a frame which travels on upper and lower horizontal rails by means of fixedly mounted wheels. The frame carries an elevator which travels vertically. Both horizontal and vertical travel of the load carrier is effected by motors mounted on the load carrier. The disclosed apparatus is disadvantageous because of the weight of the actuating motors and motor mounts and the inconvenience of fixedly mounting wheels on the frame to facilitate horizontal travel. Thus, the load carrier is difficult to remove and replace, is difficult to maintain and is susceptible to jerky and rough movement. A similar apparatus is disclosed in U.S. Pat. No. 4,113,119, issued Sept. 12, 1978, entitled "Apparatus For Loading Articles Onto Vertically Spaced Horizontally Disposed Shelves". As disclosed, the article loading apparatus is manually driven, thus eliminating heavy motors on the apparatus. However, the apparatus is mounted for horizontal travel on fixedly mounted wheels, making it difficult to maintain and to remove and replace.

Several devices have been proposed for moving articles in which the devices are mounted on V-shaped wheels which travel on horizontal V-shaped rails. See, e.g., U.S. Pat. No. 4,363,Z57, issued Dec. 14, 1982, entitled "Strikedown Service Mechanism For A Vertical Launching System"; U.S. Pat. No. 4,099,10Z, issued July 4, 1978, entitled "Movable Feeding Apparatus For High Shelf Storage Devices"; U.S. Pat. No. 2,980,Z65, issued Apr. 18, 1961, entitled "Transfer Crane". However, the devices disclosed in each of these patents utilizes actuating motors mounted on the devices which increases the weight of the device thus making it harder to remove and replace and to maintain. Moreover, the devices are mounted on fixedly mounted wheels which makes for rougher handling of articles being carried.

SUMMARY OF THE INVENTION

According to the present invention, there is provided a magnetic tape cassette transport/accessor assembly which obviates the disadvantages of the prior art. According to an aspect of the present invention, a magnetic tape cassette transport/accessor assembly is provided, which is lightweight and reliable, which is easy to remove and replace, which is easy to maintain and which effects transport of a cassette in a gentle and safe manner.

According to an aspect of the present invention, a magnetic tape cassette transport/accessor assembly includes upper and lower carriages having spring biased V-shaped grooved wheels. The V-shaped wheels travel on spaced, parallel upper and lower V-shaped horizontal rails. The cassette transport/accessor assembly has no actuating motors mounted thereon which makes the assembly lightweight and reliable. The spring biased upper and lower wheeled carriages permit easy removal and replacement of the lightweight assembly, as well as easy maintenance thereof.

DESCRIPTION OF THE DRAWINGS

In the detailed description of the preferred embodiments of the invention presented below, reference is made to the accompanying drawings in which like numbers represent like elements.

FIGS. 2A and 2B are, respectively, front perspective and diagrammatic views of a cassette transport/accessor assembly according to an embodiment of the present invention.

FIGS. 3A and 4 are perspective views of components of the apparatus of FIGS. 2A and 2B, while FIG. 3B is a partial, sectional view of a segment of the components shown in FIG. 3A.

DESCRIPTION OF THE PREFERRED EMBODIMENTS

In the following description, a preferred embodiment of the present invention will be described as used in conjunction with magnetic tape cassette storage and record/reproduce apparatus. It will be understood, however, that the present invention may also be used with storage systems for other types of electronic media, such as optical disks.

As used in this application, the term "accessor" defines an assembly which grips or holds a magnetic tape cassette, (1) while the assembly is moved into or out of a cassette storage location or a cassette loading location of a record/reproduce device, to insert or extract the cassette at the location; and (2) while the assembly is transported between storage and/or loading locations.

Figure 1:
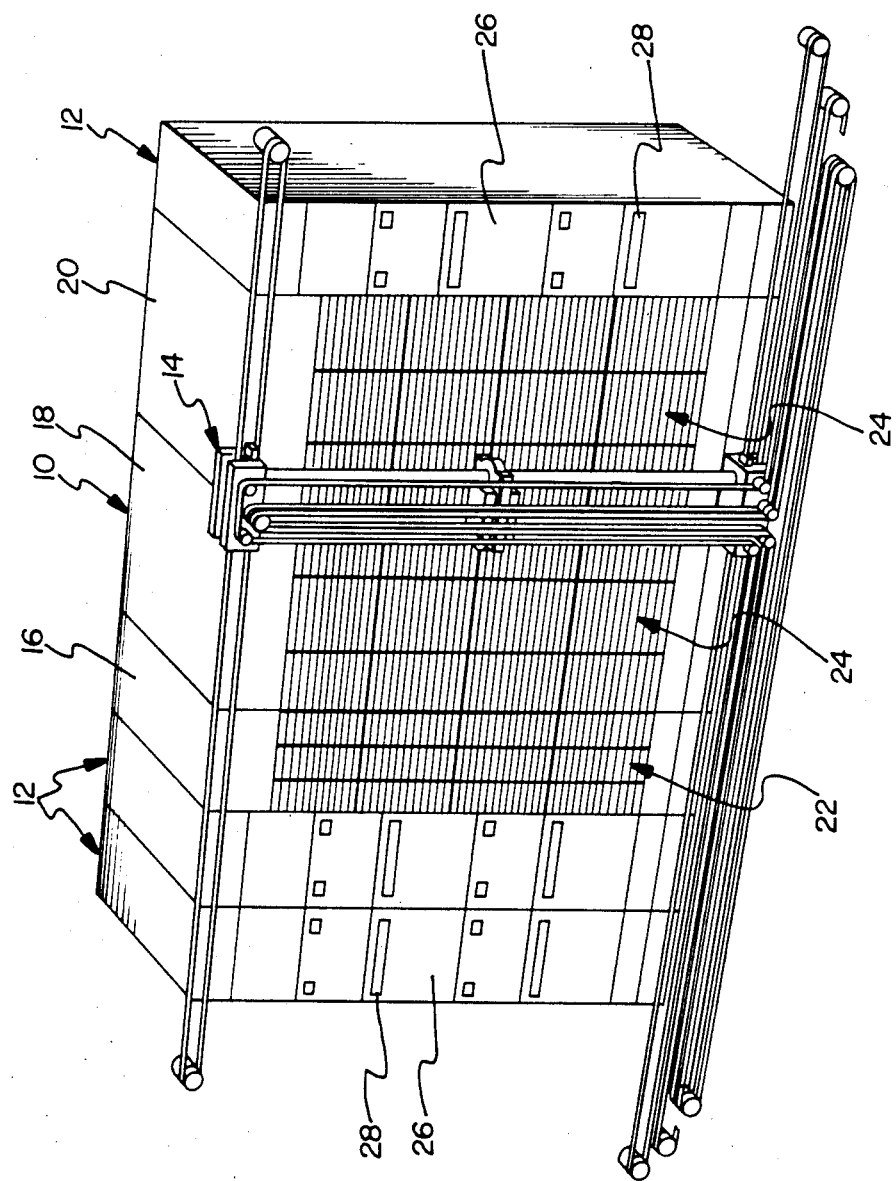
FIG. 1 is a perspective, diagrammatic view of a magnetic tape cassette storage and utilization system incorporating an embodiment of the present invention.

Referring now to FIG. 1, there is shown magnetic tape cassette storage system 10, magnetic tape record/reproduce modules 12 and magnetic tape cassette transport/accessor assembly 14. Cassette storage system 10 includes side-by-side storage modules 16, 18 and 20. Storage module 16, for example, has a matrix of small cassette storage compartments 22 for storing small magnetic tape cassettes. Storage modules 18 and 20 have a matrix of large cassette storage compartments 24 for storing large magnetic tape cassettes. Each of storage modules 16, 18 and 20 comprise a matrix of columns and rows of cassette storage compartments to store a large number of magnetic tape cassettes of a given size.

Each record/reproduce module 12 includes two magnetic tape record/reproduce devices 26, which include a cassette loading slot 28, through which a magnetic tape cassette is inserted into and extracted from device 26.

Figure 2A:
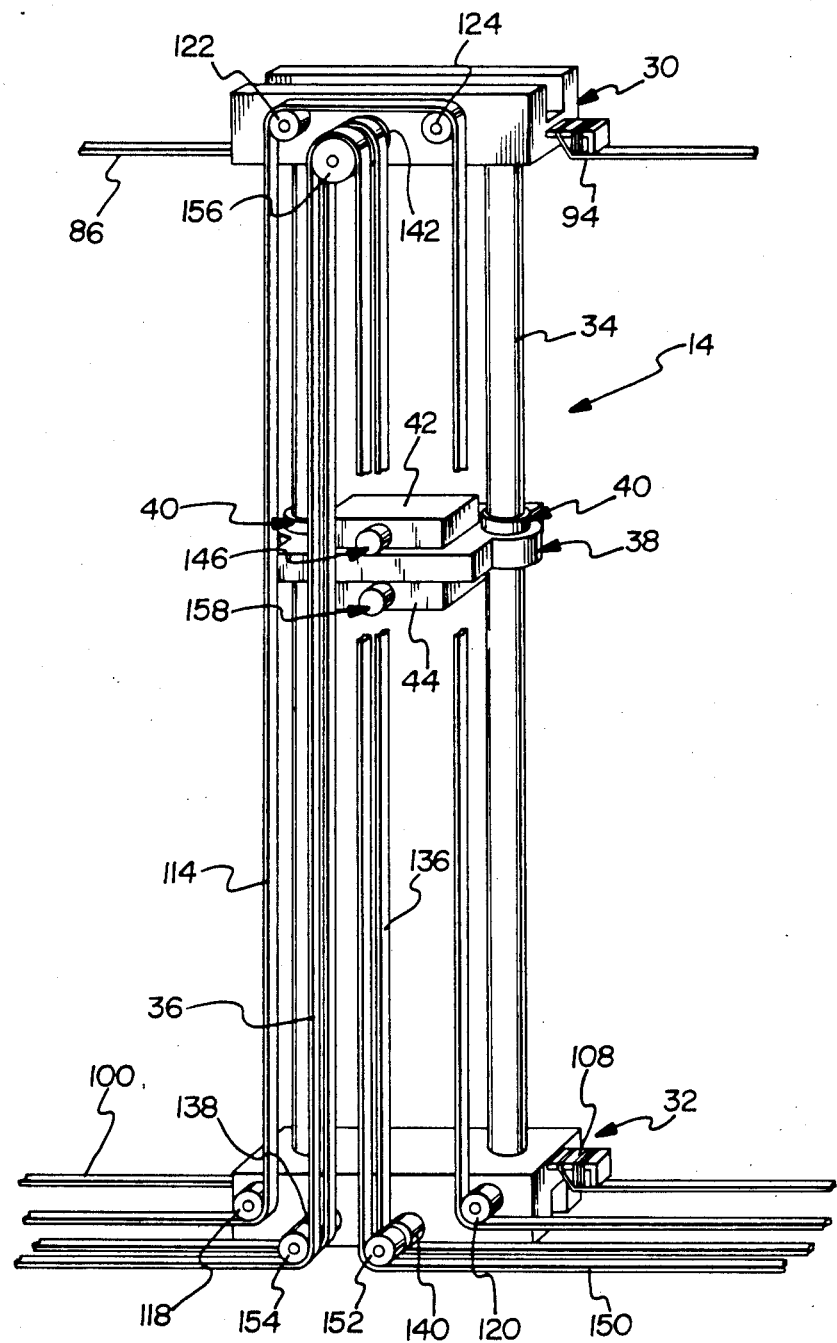

Referring now to FIGS. 2A–4, there will be described in greater detail the cassette transport/accessor assembly 14 according to an embodiment of the present invention. As shown in FIG. 2A, cassette transport-/accessor assembly 14 includes, upper carriage 30, lower carriage 32, vertical rails 34 and 36, rigidly mounted on carriages 30 and 32, and accessor platform 38, which is mounted for vertical movement on vertical rails 34 and 36 by means of bearings 40. Accessor platform 38 carries two magnetic tape cassette accessors 42 and 44.

As shown in FIG. 3A, upper carriage 30 travels on V-shaped upper rail 46 and lower carriage 32 travels on V-shaped lower rail 48. Rails 46 and 48 are parallel and are respectively located at the top and bottom of modules 12, 16, 18 and 20. Rails 46 and 48 extend the length of modules 12, 16, 18, 20. Carriage 32 includes a housing 50 mounted on wheel-carrying member 52 by means of springs 54 and 56. Member 52 rotatably mounts a plurality of V-shaped wheels 60 by means of brackets 62. As shown in FIG. 3B, rail 48 and wheels 60 have complementary V shapes.

Upper carriage 30 is similar in construction to lower carriage 32. Carriage 30 includes housing 64 mounted on wheel-carrying member 66 by means of springs 68. Member 66 supports a plurality of V-shaped wheels 70 by means of wheel brackets 72.

A sprocket driven belt drive system drives the cassette transport/accessor assembly 14 in three mutually orthogonal directions, i.e. horizontal, vertical and lateral directions. By eliminating drive motor and drive motor supports on the cassette transport/accessor assembly, the weight of the assembly is kept to a minimum. Such weight reduction minimizes stresses in the transport/accessor assembly drive and in load-bearing components. This minimized stress is directly translatable into improved reliability and maintainability. Moreover, since the need to supply electrical power to motors which are mounted on moving components is eliminated, there are also eliminated moving electrical conductors and/or electrical power transmission elements, such as slip rings.

As shown in FIGS. 2A and 2B, there is provided an upper carriage belt drive 74, a lower carriage belt drive 76, accessor platform belt drive 78 and accessor belt drive 80. Upper and lower carriage belt drives 74 and 76 provide horizontal movement to the transport/accessor assembly and cause carriages 30 and 32 to travel along rails 46 and 48, respectively. Drives 74 and 76 are driven synchronously so that the assembly is not subjected to any tilting forces. Accessor platform belt drive 78 drives accessor platform 38 vertically along rails 34 and 36. Accessor belt drive 80 drives the accessor or accessors on accessor platform 38 laterally to insert and extract magnetic tape cassettes from the storage compartments of cassette storage system 10 and from the cassette loading slots of record/reproduce modules 12.

Upper carriage belt drive 74 includes an upper carriage drive motor 82 (FIG. 2B) connected to sprocket 84. Sprocket 84 drives perforated stainless steel belt 86. Belt 86 is trained about sprocket pulley 88 and is fixedly attached at one end 90 to upper carriage 30 and at its other end 92 to carriage 30 by means of spring dampener assembly 94. Lower carriage belt drive 76 includes lower carriage drive motor 96 connected to sprocket 98. Sprocket 98 drives perforated stainless steel belt 100 which is trained around sprocket pulley 102. Belt 100 is fixedly attached to lower carriage 32 at one end 104 and at the other end 106 by means of spring dampener assembly 108.

Accessor platform belt drive 78 includes accessor platform drive motor 110 connected to sprocket 112. Sprocket 112 drives perforated, stainless steel belt 114 which is also trained about sprocket pulley 116. Belt 114 is also trained about sprocket pulleys 118 and 120 mounted on lower carriage 32 and about sprocket pulleys 122 and 124 mounted on upper carriage 30. Belt 114 is fixedly attached at one end 126 to accessor platform 38 and at its other end 128 to accessor platform 38 by means of spring dampener assembly 130.

As shown diagrammatically in FIG. 2B, accessor belt drive 80 includes accessor drive motor 132 which is connected to sprocket 134. Sprocket 134 drives perforated stainless steel belt 136. Belt 136 is trained about sprocket pulleys 138 and 140 rotatably mounted on lower carriage 32, about sprocket pulley 142 rotatably mounted on upper carriage 30 and about sprocket pulley 144. Belt 136 engages a sprocket 146 which is mounted on accessor platform 38 by means of bracket 148.

A second accessor belt drive is provided for driving accessor 44 in a lateral direction. (See: FIG. 2A) The second accessor belt drive includes a perforated stainless steel belt 150 driven by an accessor drive motor (not shown). Belt 150 is trained about sprocket pulleys 152 and 154 rotatably mounted on lower carriage 32 and about sprocket pulley 156 rotatably mounted on upper carriage 30. Belt 150 engages sprocket 158 mounted on accessor platform 38. Belt 150 drives accessor 44 to travel in a lateral direction to insert and extract a magnetic tape cassette. Motors 82, 96, 110 and 132 (and the motor for belt 150) are preferably brushless direct current motors.

Figure 5:
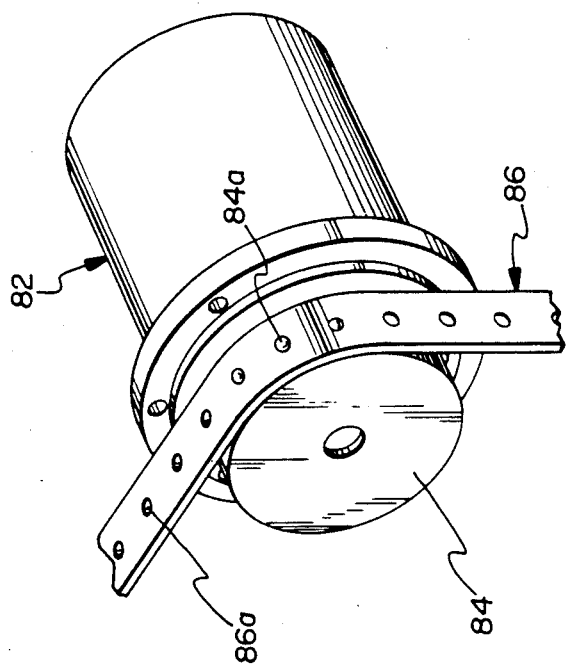
FIG. 5 is a perspective view showing, in detail, a motor-sprocket-belt drive used in the apparatus shown in FIGS. 2A and 2B.

FIG. 5 shows a perspective view of upper carriage drive motor 82 connected to sprocket 84. Belt 86 has perforations (sprocket holes) 86a which are engaged by sprocket teeth 84a of sprocket 84. Drive belts 86, 100, 114, 136 and 150 are high yield, stainless steel belts. The stress in the stainless steel belts to move their respective loads is very low when compared to the strength of the belt material. The belts are installed with low tension in order that the friction force between a drive belt and a sprocket pulley is not sufficient to drive the respective load in acceleration. Thus, the sprocket teeth of the drive sprocket will drive the belt unaided and unopposed by belt friction.

Spring dampener assemblies 94, 106 and 130 provide smooth acceleration and deceleration of the respective assemblies driven by the belts to which they are attached. The spring dampener assemblies also provide compensation for differential thermal expansion and contraction. Reference is made to commonly assigned, copending U.S. patent application No. 285,835 entitled "Spring Dampener Assembly For A Sprocket Driven Belt Drive System", for a more detailed description of a preferred spring dampener assembly.

Figure 4:
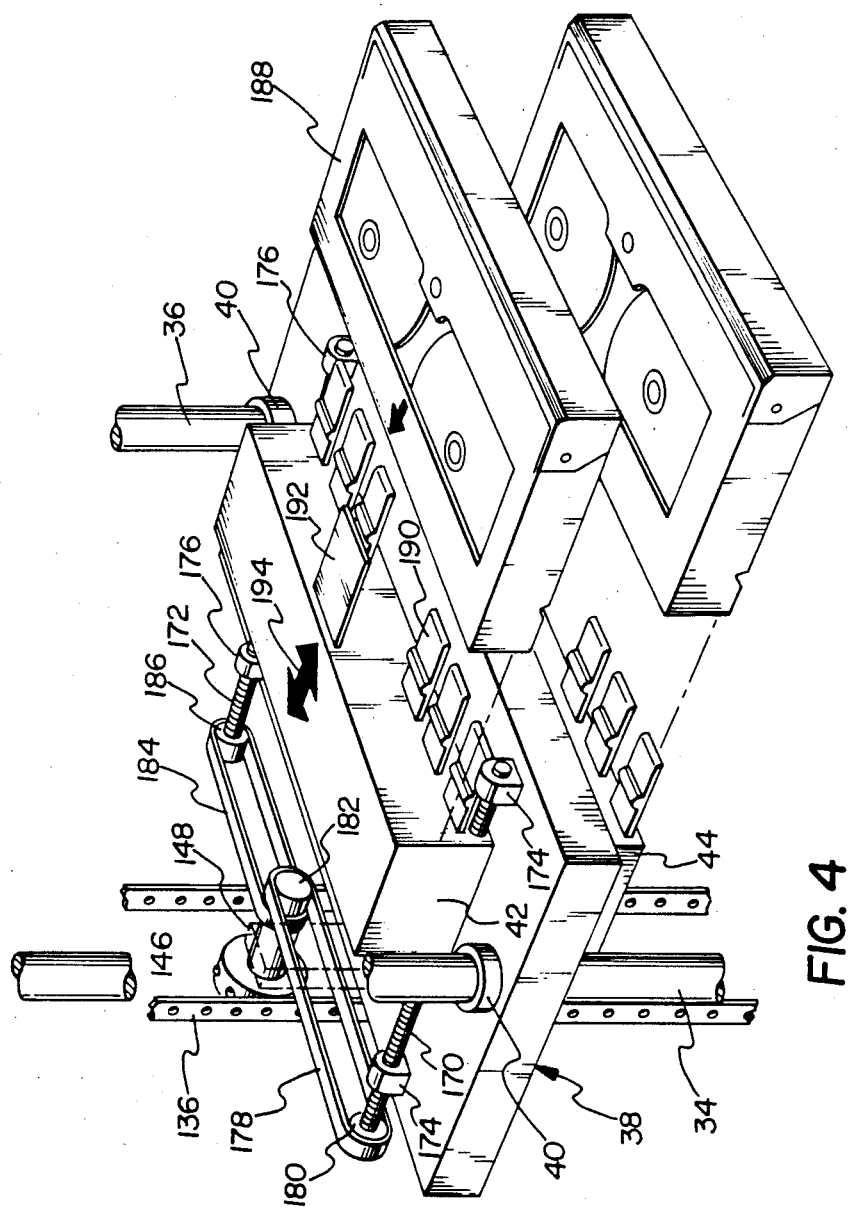

Referring now to FIG. 4, there is shown in greater detail, cassette accessor assemblies 42 and Cassette accessor 42 is mounted for lateral movement on accessor platform 38 by means of lead screws 170 and 172, respectively mounted on platform 38 by means of brackets 174 and 176.

Rotation of sprocket 146 by drive belt 136 rotates screws 170 and 172 by means of timing belts 178 and 184. Belt 178 is trained about a pulley 180 which is mounted on screw 170, and also about a shaft 182 upon which sprocket 146 is mounted. Belt 184 is trained about a pulley 186 which is mounted on screw 172 and also about shaft 182.

Accessor 44 is driven in a lateral direction by a similar screw assembly (not shown).

A magnetic tape cassette 188 is gripped by lower fingers 190 and upper finger 192. Reference is made to copending U.S. patent application Ser. No. 286,403, entitled ACCESSOR FOR A MAGNETIC TAPE CASSETTE, for a more detailed description of the operation of accessors 42 and 44. In general, an accessor is moved into and out of a storage compartment or a cassette loading slot to insert or extract a magnetic tape cassette. The fingers 190 and 192 are locked and unlocked by the motion of the accessor in a lateral direction (as shown by arrow 194).

The cassette transport/accessor assembly 14 physically transports any size magnetic tape cassette between any cassette storage compartment 22 or 24 in cassette storage system 10, and any other storage compartment in system 10 or a cassette loading slot of any record/reproduce device 26 in modules 12. In actuating the upper and lower carriage drive motors 82 and 96 and accessor platform drive motor 110, the accessor platform may be moved horizontally, vertically, or diagonally to position the accessor platform at any location for inserting or extracting a magnetic tape cassette. After the accessor platform 38 has been properly positioned, accessor drive motor 132 is actuated to move the accessor 42 (or 44) laterally to extract or insert a magnetic tape cassette. By providing two accessors 42 and 44 on accessor platform 38, one accessor may be used to extract a cassette from a record/reproduce device, while the other accessor inserts the next magnetic tape cassette to be used by the record/reproduce device. Thus, cassette exchange is effected in a minimum amount of time. During the time that a magnetic tape cassette is being loaded, threaded and played (or recorded) in a magnetic tape record/reproduce device, the transport/accessor assembly 14 travel to deposit the last used magnetic tape cassette in its storage compartment and to access another magnetic tape cassette to be used by a record/reproduce unit.

The invention has been described above in detail with respect to preferred embodiments thereof, but it will be understood that variations and modifications can be effected within the spirit and scope of the invention.

What is claimed is:

1. Apparatus for transporting a magnetic tape cassette comprising:
    spaced, parallel, upper and lower horizontal rails;
    an upper carriage mounted for horizontal movement on said upper rail and a lower carriage mounted for horizontal movement on said lower rail;
    a vertical rail structure mounted on and extending between said upper and lower carriages;
    a platform mounted for vertical movement on said vertical rail structure;
    a magnetic tape cassette gripper assembly mounted on said platform for movement in a direction substantially orthogonal to said horizontal and vertical directions;
    a first drive belt means coupled to one of said upper and lower carriages and first stationary motor means for driving said first drive belt means to cause said one carriage to effect said horizontal movement along the rail on which it is mounted;
    a second drive belt means coupled to said platform and second stationary motor means for driving said second drive belt means to cause said platform to effect said vertical movement along said vertical rail structure;
    a third drive belt means coupled to said magnetic tape cassette gripper assembly and a third stationary motor means for driving said third drive belt means to cause said gripper assembly to effect movement in said orthogonal direction; and
    wherein selective actuation of said first, second and third stationary motor means effects movement of said gripper assembly in said horizontal, vertical and orthogonal directions.

2. The apparatus of claim 1 wherein said upper and said lower rails are respectively V-shaped and wherein said upper and lower carriages respectively have spring biased sets of V-shaped grooved wheels engaging said respective V-shaped rails.

3. The apparatus of claim 2 wherein each of said upper and lower carriages includes a housing within which said set of wheels is mounted by means of a spring assembly.

* * * * *